No. 678,134. Patented July 9, 1901.
C. E. PARKER.
BALE OF FIBROUS MATERIAL.
(Application filed May 9, 1901.)

(No Model.)

Witnesses
Inventor
Charles E. Parker
By his Attorneys

UNITED STATES PATENT OFFICE.

CHARLES E. PARKER, OF ORANGE, NEW JERSEY.

BALE OF FIBROUS MATERIAL.

SPECIFICATION forming part of Letters Patent No. 678,134, dated July 9, 1901.

Original application filed April 3, 1901, Serial No. 54,120. Divided and this application filed May 9, 1901. Serial No. 59,352. (No model.)

*To all whom it may concern:*

Be it known that I, CHARLES E. PARKER, a citizen of the United States, and a resident of Orange, New Jersey, have invented certain new and useful Improvements in Bales of Fibrous Material, of which the following is a specification.

This application is a division of my application, Serial No. 54,120, filed April 3, 1901.

The present application relates to bales of fibrous material in which the material is wound in a continuous spiral, but in which the layers are not superposed the one upon the other, but wound one within or one without the other, so as to produce, in effect, a series of nested layers each one binding the other, whereby expansion of the bale longitudinally is prevented by the friction of the various layers upon each other. In other words, it is a bale which combines the non-expansive feature of the ordinary convolute bale and the advantages of the spirally-formed bale without the disadvantages of either.

Figure 1:
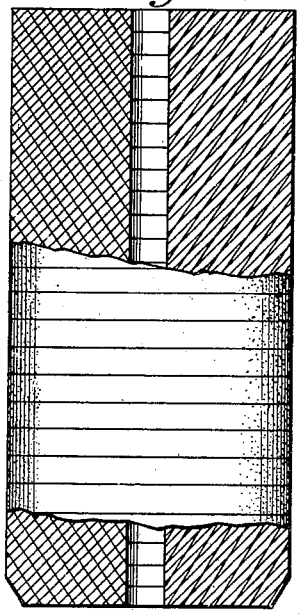
Figure 3:
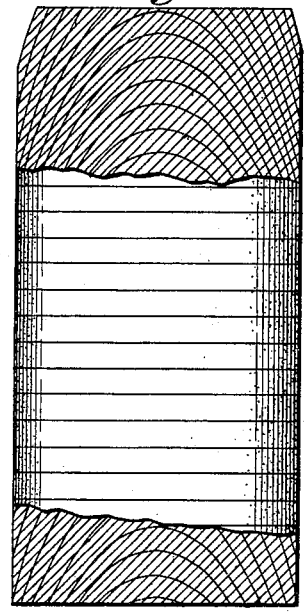
Figure 2:
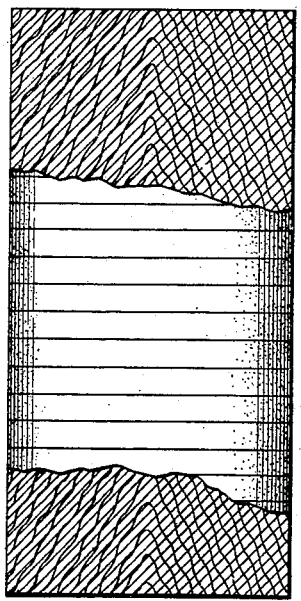
Figure 4:
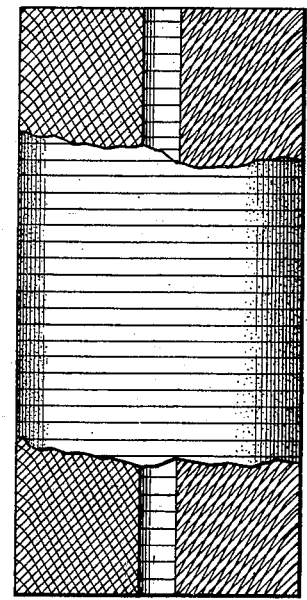

In the drawings forming part of this specification, Figures 1 and 4 are views, partly in section, showing bales made with an inverted substantially cone-shaped abutment. Fig. 3 is a view, partly in section, showing a bale formed by the use of an abutment substantially paraboloidal. Fig. 2 is a view showing a bale formed with an abutment having a spiral working face.

The mechanism for producing these various bales, as described, is clearly shown and described in my application above referred to and need not be specifically described here. It is sufficient to say that the bale is formed by material fed through a slot in a substantially conical abutment, the receiver and abutment having motion relative to each other whereby the fibrous material will be drawn in and wound in substantially spiral layers, which are nested one within the other and which bind upon each other to produce a non-expansive bale. It is evident that each layer of material will be in the form of the particular abutment used. As the material is fed in in a continuous spiral and in a plane at an angle to the longitudinal axis of the bale, it is easily demonstrated mathematically that the effect is to cause each layer to bind one upon the other with such force that the friction between the layers is sufficient to prevent longitudinal expansion. I thus produce a bale which consists of a series of nested self-binding layers, the principal advantage of which is that it cannot expand longitudinally. Therefore bale-ties may be dispensed with, or if the bale-ties be used for additional security the bale will not expand upon said ties being broken or the covering removed, while at the same time the layers of material can be readily pulled out from the bale when desired. I thus avoid the danger which at present exists in spirally-formed bales—namely, that of the expansion of the bale in a longitudinal direction if by accident or from heat of conflagration the bale-ties be broken, which longitudinal expansion greatly increases the danger from fire.

It will be observed that a bale made as above described will have a projection at one end and a recess at the other end corresponding to the shape of the abutment. I overcome this objection and produce a bale with square ends by varying the width of the layer of material being fed at the beginning of the operation of forming and at the completion of each bale—that is, at starting a narrow layer is fed, which is gradually increased in width until the full width is obtained. At the close or finish of the bale the layer is gradually reduced in width, or, in other words, the layers at each end of the bale are tapering in form. It is evident that by this means the ends of the bale will be substantially square, as shown in the drawings.

What I claim, and desire to secure by Letters Patent, is—

1. A bale of fibrous material composed of nested, self-binding layers, substantially as described.

2. A bale of fibrous material composed of nested, self-binding layers, the layers at each end being tapering in form, substantially as described.

CHAS. E. PARKER.

Witnesses:
A. W. GRIFFING,
A. W. GRIFFING, Jr.